United States Patent [19]

Messina et al.

[11] Patent Number: 4,987,988
[45] Date of Patent: Jan. 29, 1991

[54] REFUSE RECYCLER

[76] Inventors: Joesph Messina, 128 Brighton' Ave., Staten Island, N.Y. 10301; George Spector, 233 Broadway RM 3815, New York, N.Y. 10007

[21] Appl. No.: 339,515

[22] Filed: Apr. 17, 1989

[51] Int. Cl.⁵ .............................................. B56G 11/12
[52] U.S. Cl. ..................... 193/2 R; 193/22; 193/23; 193/32; 209/655; 209/375; 186/3; 220/1 T; 232/1 E; 232/43.2
[58] Field of Search ...................... 193/1, 2 R, 32, 33, 193/34, 40, 16, 4, 22, 23, 29, 30; 186/2, 3; 209/375, 655; 220/1 T; 232/1 E, 43.2

[56] References Cited

U.S. PATENT DOCUMENTS

| 323,847 | 9/1907 | Richards | 232/1 E |
|---|---|---|---|
| 1,227,964 | 5/1917 | Sheppard | 220/1 T |
| 1,482,144 | 1/1924 | Pender | 220/1 T |
| 2,885,975 | 5/1959 | Campbell | 193/33 |
| 3,249,192 | 5/1966 | Buskirk | 193/16 |
| 3,261,441 | 7/1966 | Mullens | 232/43.2 |
| 3,279,685 | 10/1966 | Price | 232/43.2 |
| 3,494,541 | 2/1970 | Smedlund | 232/43.2 |
| 3,554,345 | 1/1971 | Mullens | 232/43.2 X |
| 3,612,638 | 10/1971 | Healy | 232/43.2 X |
| 3,666,169 | 5/1972 | Eaton | 232/43.2 |
| 3,713,581 | 1/1973 | Mullens | 232/1 E |
| 4,545,502 | 10/1985 | Reuter | 220/1 T X |
| 4,679,700 | 7/1987 | Tharrington et al. | 220/1 T X |

FOREIGN PATENT DOCUMENTS 509028  1/1955  Canada ............................. 232/1 E Primary Examiner—H. Grant Skaggs
Assistant Examiner—D. Glenn Dayoan

[57] ABSTRACT

Refuse collecting and conveying apparatus for recycling various types of trash is provided which will separate and collect specific varieties of trash in exterior trash cans to be conveyed to a recycling plant.

3 Claims, 1 Drawing Sheet

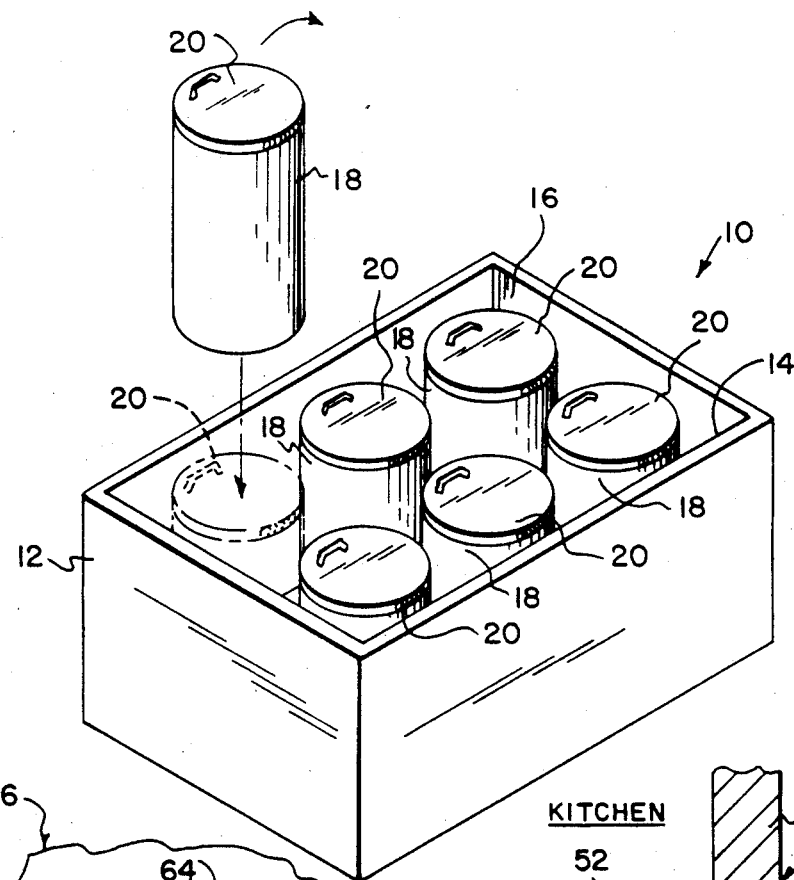
Fig. 1
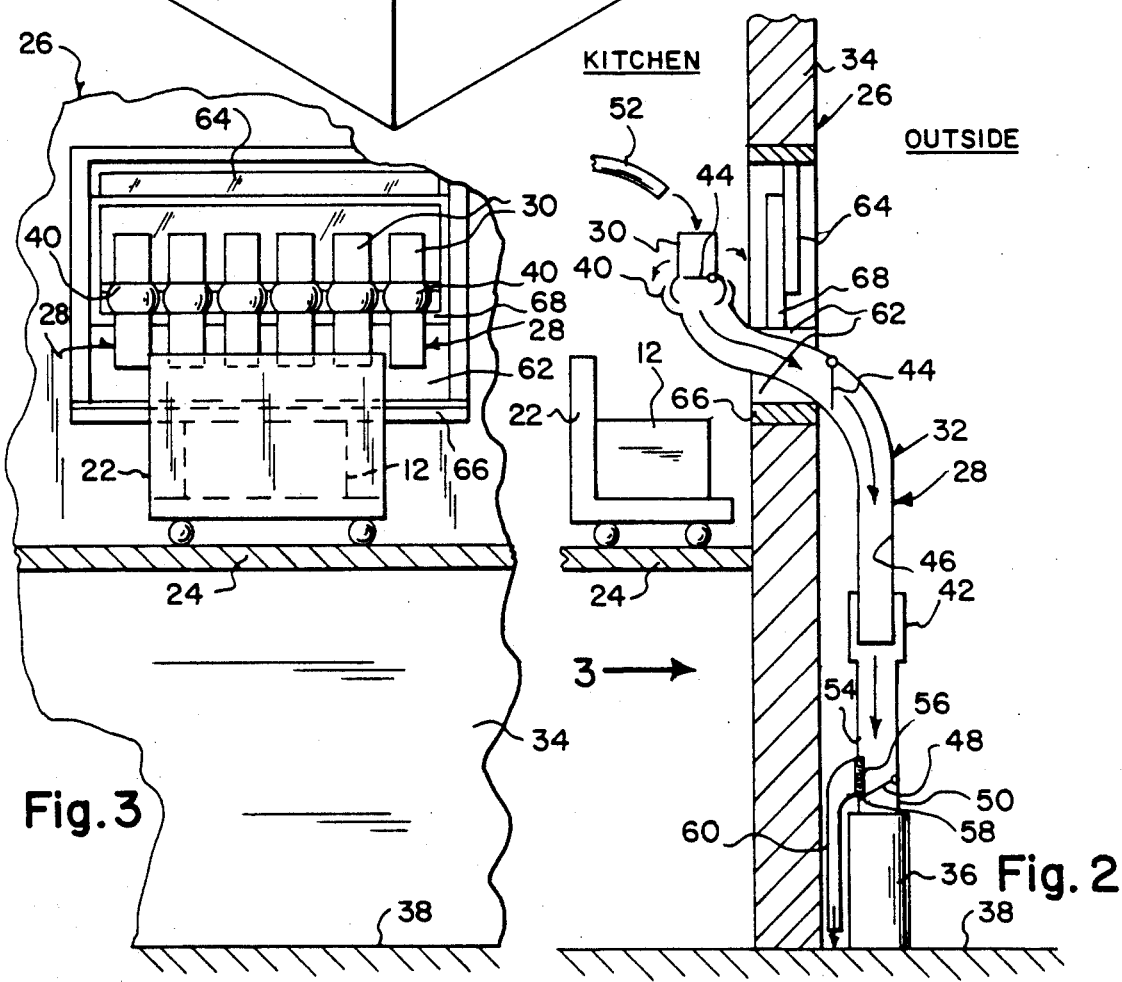
Fig. 2
Fig. 3

REFUSE RECYCLER

BACKGROUND OF THE INVENTION

The instant invention relates generally to garbage disposal systems and more specifically it relates to a refuse conveyor and collecting apparatus for trash to be recycled.

Numerous garbage disposal systems have been provided in prior art that are adapted to separate various types of trash so that the trash can be salvaged and reused again thus reducing the cost for disposing the residue trash. While these units may be suitable for the particular purpose to which they address, they would not be as suitable for the purposes of the present invention as heretofore described.

SUMMARY OF THE INVENTION

A primary object of the present invention is to provide a refuse conveyor and collecting apparatus for trash to be recycled that will overcome the shortcomings of the prior art devices.

Another object is to provide a refuse conveyor and collecting apparatus for trash to be recycled which will separate specific varieties of trash so that the different trash can be conveyed to respective trash cans to be recycled and used again.

An additional object is to provide a refuse conveyor and collecting apparatus for trash to be recycled in which the different trash cans each be conveyed to the trash cans by one of several ducts disposed through a building wall or window.

A further object is to provide a refuse conveyor and collecting apparatus for trash to be recycled that is simple and easy to use.

A still further object is to provided a refuse conveyor and collecting apparatus for trash to be recycled that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 1 is a perspective view of a receptacle having removable containers which receive specific varieties of trash to be conveyed to respective trash cans for recycling purposes.

FIG. 2 is a diagrammatic side view partly in section, showing the invention as used, wherein the containers are carried in a receptacle on a portable cart and the trash conveyed to the trash cans by several ducts through a building wall or window with provisions for washing the ducts.

FIG. 3 is a diagrammatic front view as indicated by arrow 3 in FIG. 2, showing the several ducts in greater detail.

DETAILED DESCRIPTION OF THE PREFERRED EMBODIMENTS

Turning now descriptively to the drawings, in which similar reference characters denote similar elements throughout the several views, FIG. 1 illustrates a refuse collector 10 that consists of a receptacle 12 having an open top 14 to form a compartment 16 within. A plurality of containers 18 are removably disposed within the compartment 16 of the receptacle 12. Each of the containers 18 receives a specific variety of trash, such as dark glass, white glass, paper, metals, plastic, garden wastes, etc., which can be conveyed to a respective trash can for recycling purposes. A lid 20 can be hinged to each container 18 and spring biased in a normally closed position for sealing the trash therein.

As shown in FIGS. 2 and 3 a portable cart 22 is disposed onto an upper floor 24 of a building 26 for carrying the receptacle 12. A plurality of parallel spaced apart elongated ducts 28 are installed within the building 26. Each duct 28 has an interior receiving segment 30 at the upper floor 24 and an exterior segment 32 extending down an outside wall 34 of the building 26 into the respective trash can 36 below at ground level 38. The trash in each of the containers 18 (see FIG. 1) can be dumped within the receiving segment 30 of one of the ducts 28 and conveyed into its respective trash can 36. In each duct 28 the receiving segment 30 has a hollow ball joint connection 40 so that the receiving segment 30 can be adjusted thereto. The exterior segment 32 has a telescopic portion 42 so that the exterior segment 32 can be vertically adjusted to height of the building 26. A pair of check gates 44 are provided. One is carried in the receiving segment 30 while other is carried in the exterior segment 32 for sealing a passageway 46 therethrough while allowing weight of the trash to pass by and enter its respective trash can 36.

A provision is provided for disposing of wash water that cleans the passageway 46 of each of the ducts 28. An angle gate 48 is carried on distal end 50 of the exterior segment 32 for deflecting the wash water that comes from a hose 52 at the receiving segment 30 towards one side 54 of the distal end 50 but allows the weight of the trash to pass by and enter its respective trash can 36. A screen 56 with a seal 58 is carried on the side 54 of the distal end 50 of the exterior segment 32 for the wash water to filter through from the angle gate 48. A channel 60 is fluidly connected at one end to the side 54 of the distal end 50 of the exterior segment 32 at the screen 56 for carrying the wash water to the ground level 38.

A shim member 62 is carried by all of the ducts 28 between the interior receiving segments 30 and the exterior segments 32. The ducts 28 can extend through a window 64 at the upper floor 24 of the building 26 with the shim member 62 sitting and held captive between sill 66 and bottom rail 68 of the window 64.

The ducts 28 can also be installed directly through the wall 34 of the building 26 in which the shim member 62 can be eliminated therefrom.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. Refuse collecting and conveying apparatus for trash to be recycled comprising:
   (a) means for collecting various types of trash in separate containers installed in a building and (b) a plurality of parallel spaced apart elongated ducts installed in the building each for conveying trash from each said container installed in a building each for conveying trash from each said container, each duct having an interior receiving segment inside said building and an exterior segment extending outside said building to respective trash cans below at ground level so that the trash in each of said containers can be dumped within said receiving segment of one of said ducts and conveyed into its respective trash can, outside said building, in combination with means for washing the ducts, wherein each of said ducts further comprises:

(c) said receiving segment having a hollow ball joint connection so that said receiving segment can be adjusted thereto;

(d) said exterior segment having a telescopic portion so that said exterior segment can be vertically adjusted to height of said building; and (e) a pair of check gates, one carried in said receiving segment while the other is carried in said exterior segment for sealing a passageway therethrough while allowing weight of the trash to pass by and enter its respective trash can.

2. A refuse apparatus as recited in claim 1 further including a means for disposing of wash water that cleans the passageway of each of said ducts which comprises:

(d) an angle gate carried on a distal end of said exterior segment for deflecting the wash water that comes from a hose at said receiving segment towards one side of the distal end but allowing the weight of the trash to pass by and enter its respective trash can;

a screen with a seal carried on the side of the distal end of said exterior segment for the wash water to filter through from said angle gate; and (f) a channel fluidly connected at one end to the side of the distal end of said exterior segment at said screen for carrying the wash water to the ground level.

3. A refuse apparatus as recited in claim 2, further comprising a shim member carried by all of said ducts between said interior receiving segments and said exterior segments so that said ducts can extend through a window at the upper floor of the building with said shim member sitting and held captive between a sill and bottom rail of the window.

* * * * *